(12) United States Patent
Sano et al.

(10) Patent No.: US 9,692,467 B2
(45) Date of Patent: Jun. 27, 2017

(54) USER APPARATUS AND INTERFERENCE REDUCTION PROCESS METHOD

(71) Applicant: NTT DOCOMO, INC., Tokyo (JP)

(72) Inventors: Yousuke Sano, Tokyo (JP); Yusuke Ohwatari, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/024,376

(22) PCT Filed: Jun. 26, 2014

(86) PCT No.: PCT/JP2014/066944
§ 371 (c)(1),
(2) Date: Mar. 24, 2016

(87) PCT Pub. No.: WO2015/045532
PCT Pub. Date: Apr. 2, 2015

(65) Prior Publication Data
US 2016/0241282 A1    Aug. 18, 2016

(30) Foreign Application Priority Data
Sep. 26, 2013 (JP) ................................. 2013-200605

(51) Int. Cl.
*H04B 1/10* (2006.01)
*H04B 7/024* (2017.01)
*H04J 11/00* (2006.01)

(52) U.S. Cl.
CPC ........... *H04B 1/1027* (2013.01); *H04B 7/024* (2013.01); *H04J 11/004* (2013.01)

(58) Field of Classification Search
USPC ......................................... 375/148, 348, 346
See application file for complete search history.

(56) References Cited

U.S. PATENT DOCUMENTS 8,238,499 B2 * 8/2012 Reial ................. H04L 25/03305
375/148
9,277,531 B2 * 3/2016 Tiirola ................. H04J 11/0026
(Continued)

OTHER PUBLICATIONS

International Search Report issued in corresponding application No. PCT/JP2014/066944 mailed Aug. 19, 2014 (4 pages).
(Continued)

*Primary Examiner* — Eva Puente
(74) *Attorney, Agent, or Firm* — Osha Liang LLP

(57) ABSTRACT

A user apparatus for use in a radio communication system, including: an interference reduction process unit configured to reduce, from a received signal received by the user apparatus, an interference signal that becomes interference to a desired signal so as to obtain the desired signal; an interference reduction process execution determination unit configured to measure reception quality of the interference signal, and to determine whether to regard the interference signal as a target of interference reduction processing based on the reception quality, wherein the interference reduction process execution determination unit determines whether to regard the interference signal as the target of interference reduction processing by comparing a first indicator value of the interference signal that is estimated from the reception quality with a second indicator value that is used for transmission of the interference signal.

12 Claims, 18 Drawing Sheets

(56) References Cited

U.S. PATENT DOCUMENTS

2011/0292974 A1* 12/2011 Lamba ............... H04B 1/7107
375/148
2016/0128025 A1* 5/2016 Zhang ................ H04J 11/005
370/329

OTHER PUBLICATIONS

Axnäs, Johan et al., "Successive Interference Cancellation Techniques for LTE Downlink"; 22nd International Symposium on Personal, Indoor and Mobile Radio Communications 2011 (5 pages).

Bai, Dongwoon et al., "Near ML Modulation Classification"; Proc. of IEEE VTC 2012, pp. 1-5 (5 pages).

3GPP TS 36211 V12.1.0, "3rd Generation Partnership Project; Technical Specification Group Radio Access Network; Evolved Universal Terrestrial Radio Access (E-UTRA); Physical channels and modulation (Release 12)"; Section 6; Mar. 2014 (120 pages).

3GPP TS 36212 V12.0.0, "3rd Generation Partnership Project; Technical Specification Group Radio Access Network; Evolved Universal Terrestrial Radio Access (E-UTRA); Multiplexing and channel coding (Release 12)"; Section 5.3; Dec. 2013 (88 pages).

3GPP TS 36213 V12.1.0, "3rd Generation Partnership Project; Technical Specification Group Radio Access Network; Evolved Universal Terrestrial Radio Access (E-UTRA); Physical layer procedures (Release 12)"; Sections 5, 7, 9; Mar. 2014 (186 pages).

3GPP TR 36.866 V12.0.1, "3rd Generation Partnership Project; Technical Specification Group Radio Access Network; Study on Network-Assisted Interference Cancellation and Suppression (NAIC) for LTE (Release 12)"; Mar. 2014 (92 pages).

MediaTek Inc., "New work item proposal for network assistance interference cancellation and suppression for LTE"; 3GPP TSG RAN Meeting #63, RP-140519; Fukuoka, Japan, Mar. 3-6, 2014 (7 pages).

Written Opinion of the International Searching Authority issued in corresponding application No. PCT/JP2014/066944 dated Aug. 19, 2014 (4 pages).

* cited by examiner

FIG.6

| CQI INDEX | $I_{MCS}$ (TS36.101) |
|---|---|
| 0 | DTX |
| 1 | 0 |
| 2 | 0 |
| 3 | 2 |
| 4 | 4 |
| 5 | 6 |
| 6 | 8 |
| 7 | 11 |
| 8 | 13 |
| 9 | 16 |
| 10 | 18 |
| 11 | 21 |
| 12 | 23 |
| 13 | 25 |
| 14 | 27 |
| 15 | 27 |

FIG.7

| MCS INDEX | MODULATION ORDER |
|---|---|
| 0 | 2 |
| 1 | 2 |
| 2 | 2 |
| 3 | 2 |
| 4 | 2 |
| 5 | 2 |
| 6 | 2 |
| 7 | 2 |
| 8 | 2 |
| 9 | 2 |
| 10 | 4 |
| 11 | 4 |
| 12 | 4 |
| 13 | 4 |
| 14 | 4 |
| 15 | 4 |
| 16 | 4 |
| 17 | 6 |
| 18 | 6 |
| 19 | 6 |
| 20 | 6 |
| 21 | 6 |
| 22 | 6 |
| 23 | 6 |
| 24 | 6 |
| 25 | 6 |
| 26 | 6 |
| 27 | 6 |
| 28 | 6 |
| 29 | 2 |
| 30 | 4 |
| 31 | 6 |

- Rows 0–9: QPSK
- Rows 10–16: 16QAM
- Rows 17–28: 64QAM
- Rows 29–31: RESERVED BITS

FIG.8

| CSI PROCESS | CSI-RS RESOURCE | CSI-IM RESOURCE |
|---|---|---|
| #1 | #1 (SIGNAL POWER FROM TP#1) | #1 (INTERFERENCE SIGNAL POWER OF CELL OTHER THAN TP#1) |
| #2 | #1 (SIGNAL POWER FROM TP#1) | #2 (INTERFERENCE SIGNAL POWER OF CELL OTHER THAN TP#1 AND TP#2) |
| #3 | #2 (ESTIMATE POWER OF COMBINED SIGNAL OF SIGNALS OF TP#1 AND TP#2) | #2 (INTERFERENCE SIGNAL POWER OF CELL OTHER THAN TP#1 AND TP#2) |

FIG.15

| MCS INDEX | CQI INDEX |
|---|---|
| DTX | 0 |
| 0 | 1 |
| 0 | 2 |
| 2 | 3 |
| 4 | 4 |
| 6 | 5 |
| 8 | 6 |
| 11 | 7 |
| 13 | 8 |
| 16 | 9 |
| 18 | 10 |
| 21 | 11 |
| 23 | 12 |
| 25 | 13 |
| 27 | 14 |
| 27 | 15 |

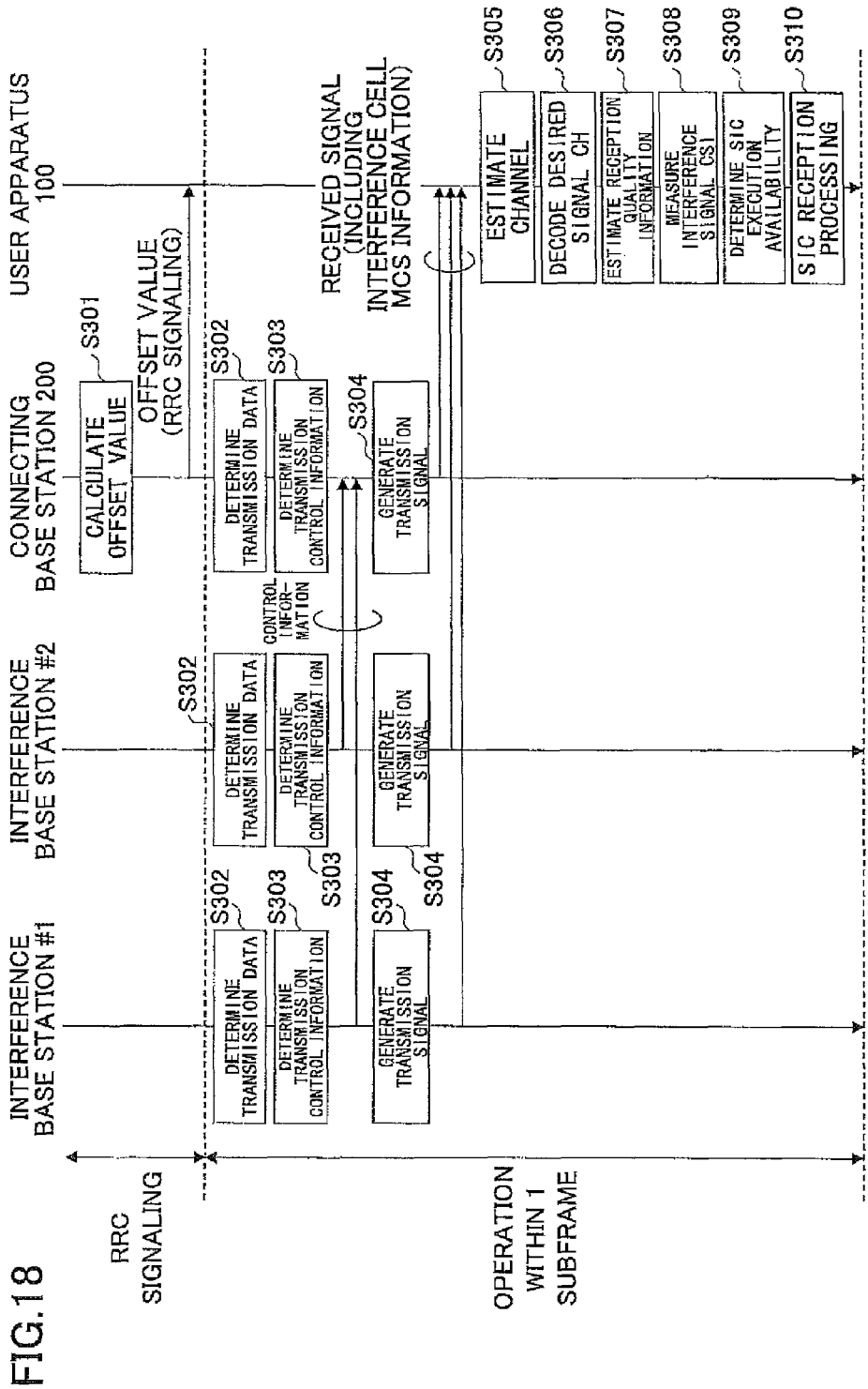

USER APPARATUS AND INTERFERENCE REDUCTION PROCESS METHOD

TECHNICAL FIELD

The present invention relates to a technique for reducing an interference signal from a received signal to obtain a desired signal in a user apparatus used in a radio communication system.

BACKGROUND ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) is proposed. In downlink transmission of MU-MIMO, one base station can communicate with a plurality of user apparatuses, and in addition to that, the base station can also transmit different data streams (layers) to one user apparatus at the same time.

Also, in the LTE-Advanced, in the downlink communication, various techniques are considered for reducing (suppressing, removing, for example), at the user apparatus, interference of an interference radio beam from an interference base station against a desired radio beam from a connecting base station, and interference by signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 5, for example) becomes an interference signal for the user apparatus 10. FIG. 1 especially shows interference from an interference cell.

RELATED ART DOCUMENT

Non-Patent Document

Non-Patent Document 1: Axnas J. et. al., "Successive Interference Cancellation Techniques for LTE Downlink," PIMRC 2011.

Non-Patent Document 2: D. Bai, et al, "Near ML Modulation Classification", in Proc. of IEEE VTC 2012, pp. 1-5.

SUMMARY OF THE INVENTION

Problem to be Solved by the Invention

As a technique for the above-mentioned interference reduction, there is successive interference cancellation (SIC: Successive Interference Cancellation).

The successive interference cancellation is a technique for generating a replica signal by performing hard decision or soft decision for the interference signal from the received signal, and successively subtracting (removing) the replica signal from the received signal so as to extract a desired signal. A functional configuration example of a SIC receiver (a SIC reception process unit in a user apparatus) is shown in FIG. 2 when the user apparatus performs the successive interference cancellation. FIG. 2 is a configuration example of soft decision SIC in which symbol demodulation is performed by IRC (Interference Rejection Combining) reception processing. For each of a plurality of interference signals, the SIC receiver performs channel estimation of the interference signal, demodulates (IRC demodulation) the interference signal based on the channel estimation, generates a replica of the interference signal, and successively subtracts the interference signal from the received signal to obtain a desired signal. In the SIC receiver, since the order (ordering hereinafter) for performing subtraction of interference replicas exerts large effects on the characteristics, the SIC receiver performs ordering in a descending order in accuracy degree of demodulation or decoding in the SIC receiver. For example, ordering is performed in a descending order of received power, for example.

The configuration of the successive interference canceller in itself is a conventional technique. Various schemes exist other than the scheme shown in FIG. 2. The present invention can be applied to any successive interference canceller, irrespective of the scheme. By the way, as a prior art document on SIC, there is the non-patent document 1, for example.

As another example of a technique for performing interference reduction, there is a Maximum Likelihood (ML) estimation technique. In the maximum likelihood estimation, the user apparatus (receiver) calculates likelihood of each signal point based on a received signal, and determines a signal point of the highest likelihood to be a transmission signal. For example, FIG. 3 shows an example of a case for performing maximum likelihood estimation (and hard decision) for a transmission signal (16 QAM) of a connecting cell. "A" in FIG. 3 is one of signal points. In the maximum likelihood estimation, a distance between every signal point and a received signal is calculated, so as to determine a signal point that is the closest (=highest likelihood) to the received signal to be a transmission signal.

In the maximum likelihood estimation technique, although reception quality is the highest compared with receivers of other schemes, the calculation amount is very large for that. For example, when each of the connecting cell and the interference cell performs transmission of 64 QAM and Rank-2, calculation of 64^4(>16 million) times is necessary for calculating the likelihood of all transmission patterns. Thus, a plurality of algorithms are proposed for decreasing calculation amount while suppressing performance deterioration to the minimum. As such an algorithm, there are, for example, Sphere Decoding (calculating likelihood of only signal points within a circle of a radius from the received signal) and QRM-ML (apply M algorithm after orthogonalizing signals using QR decomposition of channel).

In the SIC receiver, MCS (Modulation and Coding scheme) and Rank of the interference signal for which replica generation and subtraction are performed exert large effects on the performance. That is, when MCS/Rank of the interference signal arrives at the receiver is too high compared with reception quality, demodulation of the interference signal cannot be performed accurately, so that generation accuracy of replica is deteriorated. For example, when reception quality of an interference signal transmitted by Rank-2 and 64 QAM is very bad, accurate demodulation and replica signal generation are difficult.

Generally, a plurality of interference waves arrive at the receiver from neighbor cells and the like. Thus, unless the SIC receiver properly determines interference signals on which SIC processing (replica generation and subtraction) is to be performed, there is a possibility in that reception performance improvement effect that meets increase of process amount with respect to conventional type linear receiver (MMSE, IRC receiver) cannot be obtained.

Such a problem is similarly applied to a ML receiver. That is, MCS (Modulation and Coding scheme) and Rank of the interference signal that is a target of likelihood calculation exert large effects on the performance. That is, when MCS/Rank of the interference signal that arrives at the receiver is too high compared with the reception quality, likelihood calculation cannot be performed accurately, likelihood determination accuracy deteriorates, so that there is a possibility in that reception performance improvement effect cannot be obtained.

The present invention is contrived in view of the above-mentioned points, and an object of the present invention is to provide a technique, in a user apparatus for performing interference reduction processing, for properly selecting an interference signal as a target for interference reduction processing to perform interference reduction processing on the selected interference signal.

Means for Solving the Problem

According to an embodiment of the present invention, there is provided a user apparatus for use in a radio communication system, including:

an interference reduction process unit configured to reduce, from a received signal received by the user apparatus, an interference signal that becomes interference to a desired signal so as to obtain the desired signal;

an interference reduction process execution determination unit configured to measure reception quality of the interference signal, and to determine whether to regard the interference signal as a target of interference reduction processing based on the reception quality, wherein the interference reduction process execution determination unit determines whether to regard the interference signal as the target of interference reduction processing by comparing a first indicator value of the interference signal that is estimated from the reception quality with a second indicator value that is used for transmission of the interference signal.

According to an embodiment of the present invention, there is provided a user apparatus for use in a radio communication system, including:

an interference reduction process unit configured to reduce, from a received signal received by the user apparatus, an interference signal that becomes interference to a desired signal so as to obtain the desired signal;

an interference reduction process execution determination unit configured to measure reception quality of the interference signal as first reception quality, and to determine whether to regard the interference signal as a target of interference reduction processing based on the first reception quality, wherein the interference reduction process execution determination unit determines whether to regard the interference signal as the target of interference reduction processing by comparing the first reception quality with second reception quality that is estimated from an indicator value that is used for transmission of the interference signal.

According to an embodiment of the present invention, there is provided an interference reduction process method executed by a user apparatus for use in a radio communication system, including:

an interference reduction process execution determination step of measuring reception quality of an interference signal that becomes interference to a desired signal of the user apparatus, and determining whether to regard the interference signal as a target of interference reduction processing based on the reception quality; and an interference reduction step of reducing, from a received signal received by the user apparatus, the interference signal that is determined to be a target of interference reduction processing by the interference reduction process execution determination step so as to obtain the desired signal;

wherein, in the interference reduction process execution determination step, the user apparatus determines whether to regard the interference signal as the target of interference reduction processing by comparing a first indicator value of the interference signal that is estimated from the reception quality with a second indicator value that is used for transmission of the interference signal.

According to an embodiment of the present invention, there is provided an interference reduction process method executed by a user apparatus for use in a radio communication system, including:

an interference reduction process execution determination step of measuring reception quality of an interference signal that becomes interference to a desired signal of the user apparatus as first reception quality, and determining whether to regard the interference signal as a target of interference reduction processing based on the first reception quality; and an interference reduction step of reducing, from a received signal received by the user apparatus, the interference signal that is determined to be a target of interference reduction processing by the interference reduction process execution determination step so as to obtain the desired signal;

wherein, in the interference reduction process execution determination step, the user apparatus determines whether to regard the interference signal as the target of interference reduction processing by comparing the first reception quality with second reception quality that is estimated from an indicator value that is used for transmission of the interference signal.

Effect of the Present Invention

According to an embodiment of the present invention, it becomes possible, in a user apparatus for performing interference reduction processing, to properly select an interference signal as a target for interference reduction processing so as to perform interference reduction processing on the selected interference signal.

BRIEF DESCRIPTION OF THE DRAWINGS

FIG. 6 is a diagram showing an example of a CQI/MCS conversion table;

FIG. 7 is a diagram showing an example of a MCS/modulation scheme correspondence table;

FIG. 8 is a diagram for explaining CSI feedback in CoMP;

FIG. 15 is a diagram showing an example of a CQI/MCS conversion table;

FIG. 18 is a diagram showing a process sequence example in a case where SIC execution availability determination is performed by reception quality information, and an offset value is reported in the second embodiment.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although SIC reception is described as a main example as an example of interference reduction processing in the following embodiments, the present invention can be applied to ML reception and other interference reduction processing other than SIC reception.

(Outline of the Embodiment)

Figure 1:
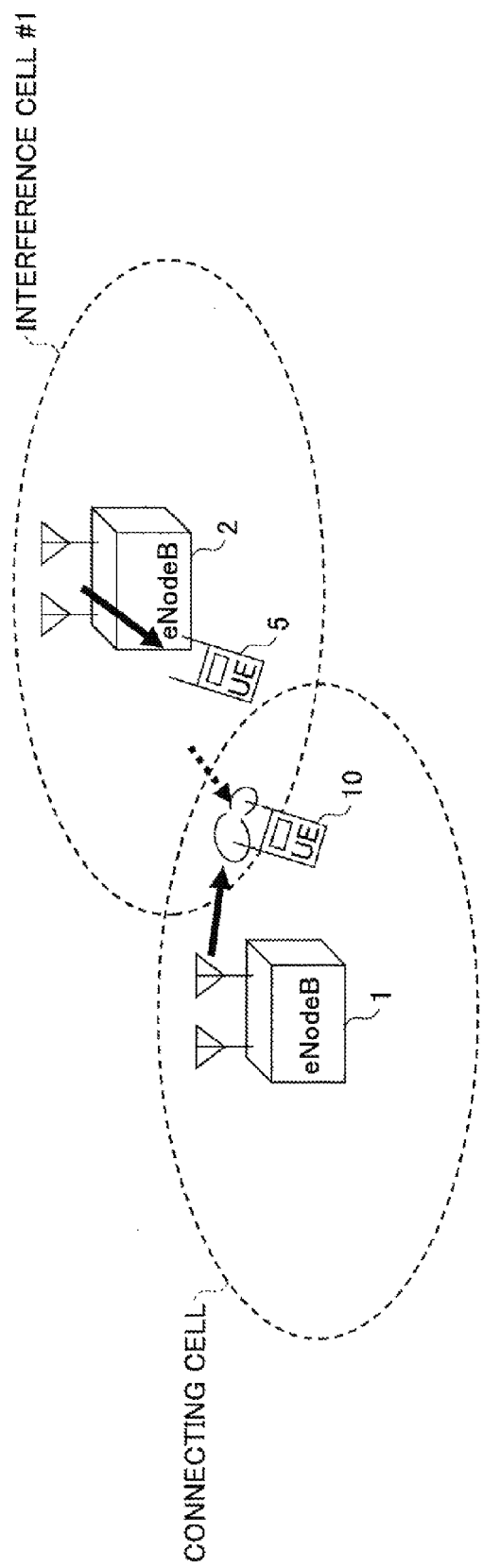
FIG. 1 is a diagram for explaining reduction of interference from an interference cell.
Figure 2:
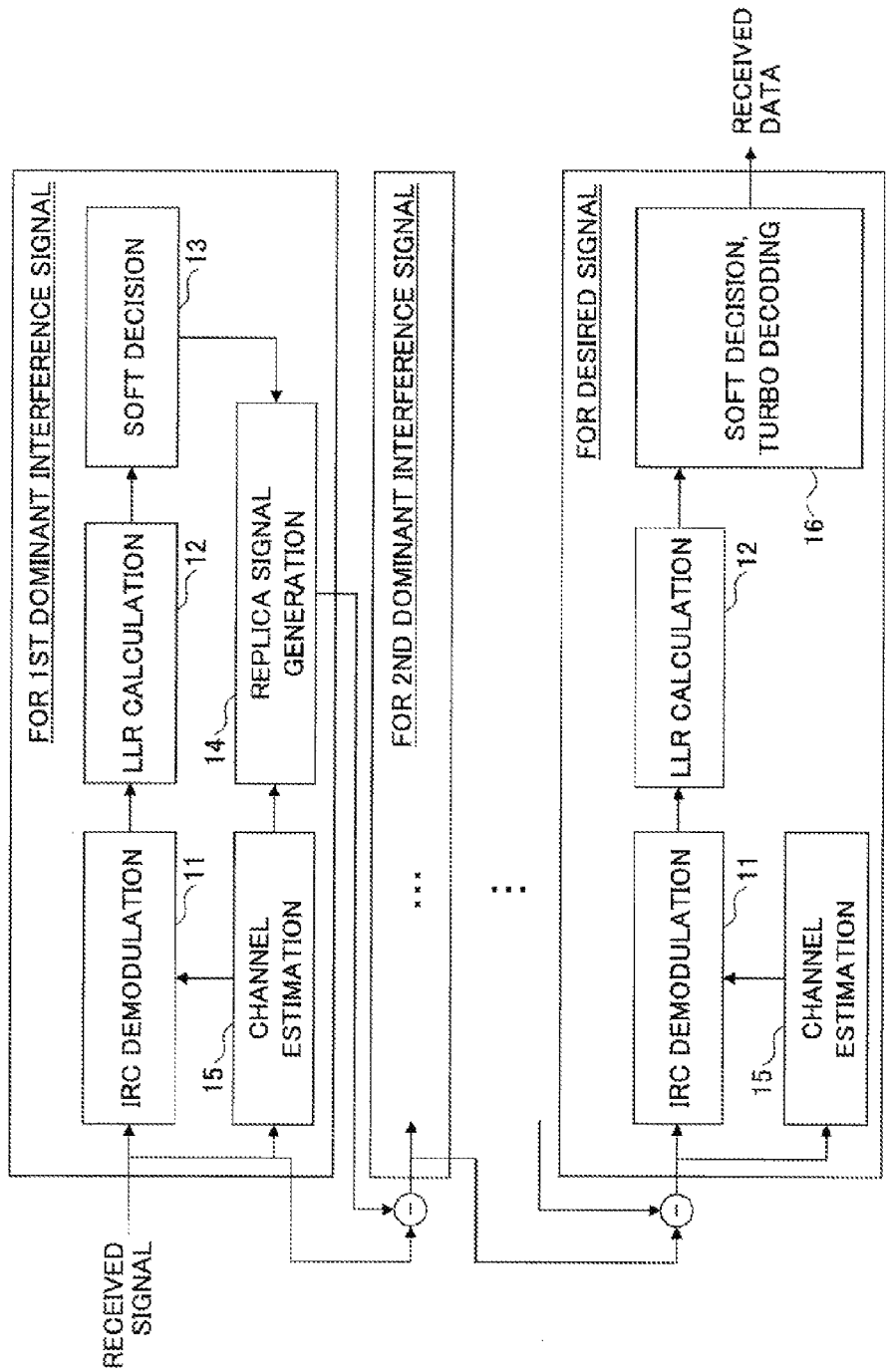
FIG. 2 is a diagram showing a functional configuration example of a user apparatus (SIC reception process unit) that performs SIC.
Figure 3:
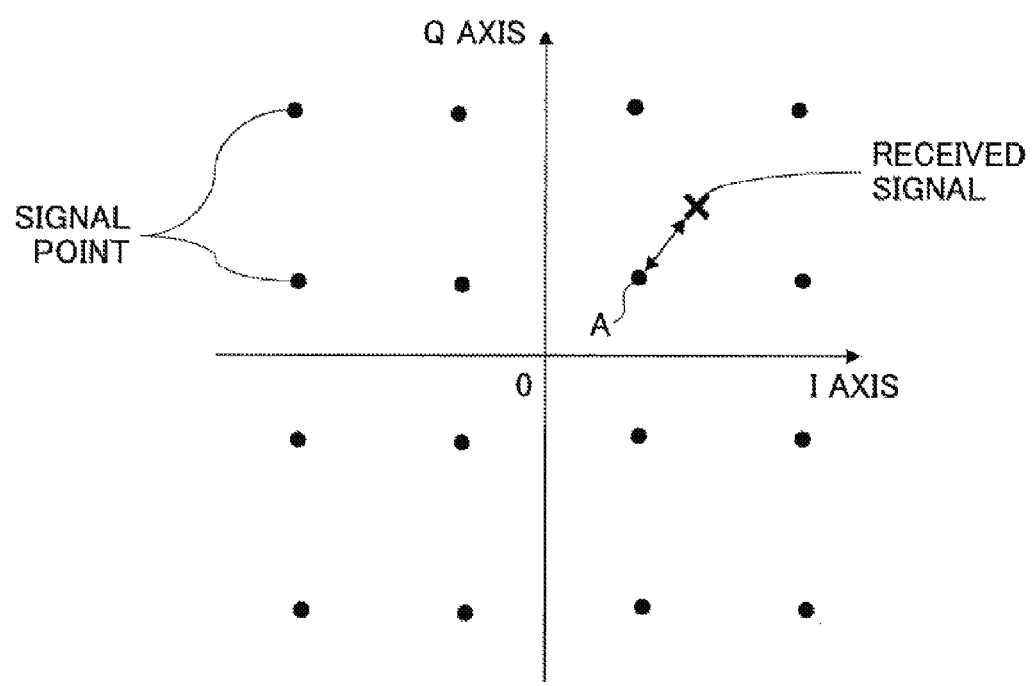
FIG. 3 is a diagram for explaining an example for performing maximum likelihood estimation (and hard decision) on an transmission signal (16 QAM) of a connecting cell.
Figure 4:
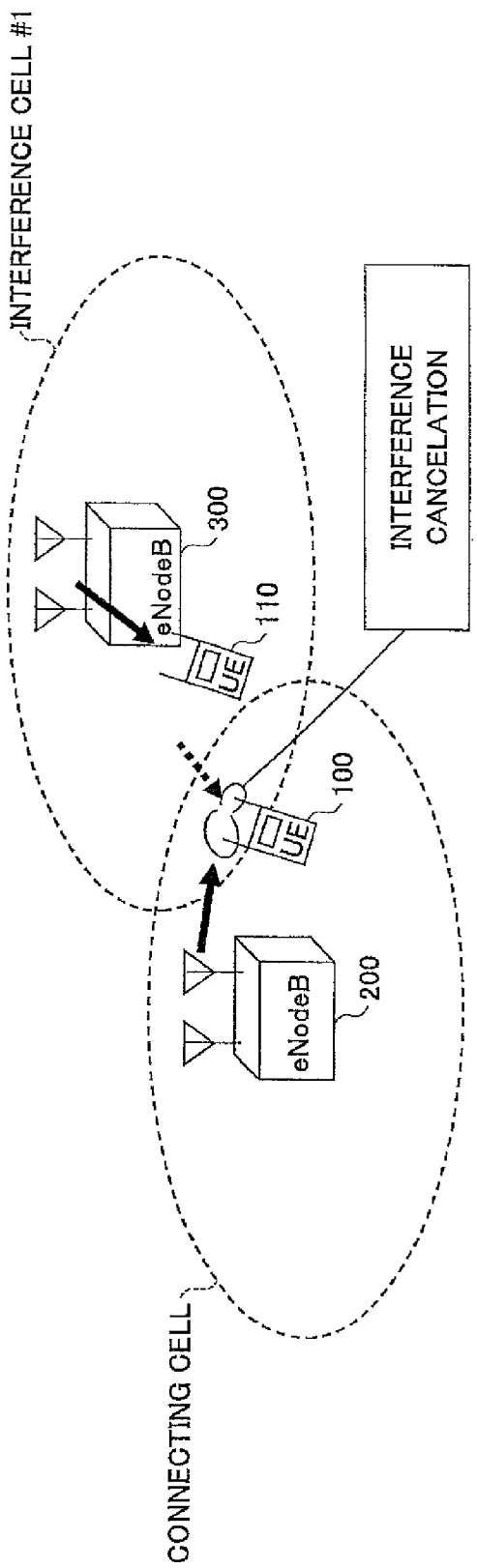
FIG. 4 is a block diagram of a radio communication system in the present embodiment.

FIG. 4 shows a schematic block diagram of a radio communication system of the present embodiment. The radio communication system of the present embodiment is a radio communication system of the LTE-Advanced scheme, for example, in which a base station 200 (eNodeB) (connecting base station) forms a connecting cell, and a user apparatus 100 (UE) in the cell performs communication with the connecting base station 200 by a desired signal. The radio communication system of the present embodiment includes at least functions defined in the LTE-Advanced. But, the present invention is not limited to the scheme of the LTE-Advanced, and the present invention can be applied also to radio communication systems of LTE of a generation prior to LTE-Advanced, to radio communication systems of the future generation of LTE-Advanced, and to schemes other than LTE/LTE-Advanced.

Normally, the radio communication system is provided with many base stations. However, FIG. 4 only shows the connecting base station 200 and the base station 300 adjacent to the connecting base station 200. This adjacent base station 300 also forms a cell to perform signal transmission and reception with a user apparatus 110 for which the base station 300 is a connecting base station. A signal transmitted from the adjacent base station 300 to the user apparatus 110 for which the base station 300 is a connecting base station becomes an interference signal for the user apparatus 100. Therefore, in the present embodiment, the adjacent base station 300 is called an interference base station. Also, a cell of the interference base station 300 is called an interference cell. Although, in general, there are a plurality of interference base stations for a connecting base station, FIG. 4 shows only one interference base station.

In the following, process outline of the present embodiment is described. In the present embodiment, since the user apparatus measures CSI, matters on CSI are described, first.

In the downlink of LTE/LTE-Advanced, Link-Adaptation is adopted in which modulation scheme and coding rate (MCS) are dynamically changed according to propagation environment between the base station and the user apparatus, and further, Rank-Adaptation is adopted in which the number of transmission streams is adaptively changed according to the propagation environment.

For proper operation of the Link/Rank-Adaptation, the base station needs to know reception quality of the user apparatus. Thus, in the LTE/LTE-Advanced downlink, the reception quality measured in the user apparatus side is processed into information of several bits—several tens of bits called CSI (Channel State Information), and the information is fed back to the base station side. The base station performs Link/Rank-Adaptation based on CSI that is fed back from the user apparatus.

CSI includes three pieces of information of CQI (Channel Quality Indicator), RI (Rank Indicator) and PMI (Preceding Matrix Indicator). CQI is information indicating reception quality in the user apparatus, RI is information of the optimum number of transmission streams measured in the user apparatus side, and PMI is information indicating optimum preceding matrix measured in the user apparatus side.

In addition to Link/Rank-Adaptation, CSI is also used for scheduling and the like in frequency/time region in the base station. Thus, CSI is basically measured by using a reference signal instead of a data signal.

In downlink CoMP (Coordinated Multi-Point transmission) in Rel.11 LTE, CSI measurement for (single or a plurality of) interference signal(s) is supported in the receiver side.

In the present embodiment, as an example, by utilizing the above-mentioned mechanism, the user apparatus having a SIC reception function measures CSI (example of reception quality information) for a plurality of interference signals by respective reference signals.

In the first embodiment, the user apparatus 100 estimates MCS/Rank based on measured CSI of each interference signal, compares the estimated MCS/Rank with MCS/Rank that has been used for actual transmission so as to determine whether to perform SIC on the interference signal. In a case where SIC is performed, the user apparatus 100 performs demodulation of the interference signal and subtraction processing, and in a case where SIC is not performed, these processes are not performed. In a case where the technique is applied to ML reception, it is determined whether to perform ML similarly. When performing ML, likelihood calculation is performed by including the interference signal, and when ML is not performed, the interference signal is not included.

In the second embodiment, the user apparatus 100 converts actual MCS/Rank into reception quality information (CQI, SNR and the like), and compares it with measured reception quality information of the interference signal so as to determine whether to perform SIC for the interference signal. This also applies to ML.

The connecting base station 200 obtains the actual MCS and Rank of the interference signal from the interference base station 300, and the connecting base station 200 reports them to the user apparatus 100. Instead of that, the user apparatus 100 may estimate actual MCS/Rank of the interference signal.

For the measurement of CSI for the interference signal, the mechanism of downlink CoMP may be used, or, the connecting base station 200 obtains, from the interference base station 300, information (example: information of reference signal) necessary for measurement of CSI for the interference signal, and reports the information to the user apparatus 100, so that the user apparatus 100 may measure CSI of the interference signal.

In the following, the first embodiment and the second embodiment are described in detail.

In the following, the first embodiment and the second embodiment are described in detail.

(First Embodiment)

<Content of the Process>

As mentioned above, in the first embodiment, the user apparatus 100 measures CSI for a plurality of interference signals by respective reference signals, and estimates MCS and Rank in which accurate demodulation for respective interference signals is considered to be possible.

The user apparatus 100 compares the estimated MCS/Rank with actual MCS/Rank in a data signal part (PDSCH) of the interference signal so as to determine SIC execution availability for each interference signal.

An example is described with reference to FIG. 5. In the example shown in FIG. 5, the user apparatus 100 measures CSI of a desired signal as CQI:#7, RI:1 based on a reference signal received from the connecting base station 200.

Also, the user apparatus 100 measures CSI of an interference signal as CQI:#5, RI:1 based on a reference signal received from the interference base station 300. As normal Link/Rank-Adaptation operation in the interference base station 300, the interference base station 300 determines MCS#21 and Rank-2, and performs communication of downlink data to the user apparatus 110 under the interference base station 300. The data is an interference signal for the user apparatus 100.

The user apparatus 100 ascertains that actual MCS and Rank of the interference signal are MCS#21 and Rank-2 respectively by a notification from the connecting base station 200, for example. The user apparatus 100 estimates MCI and Rank, by which accurate demodulation for the interference signal is considered to be available, to be MCI#6 and Rank-1 respectively based on CSI (CQI:#5, RI:1) of the measured interference signal, and determines availability of execution of SIC for the interference signal by comparing MCI#6, Rank-1 with MCS#21, Rank-2.

Figure 5:
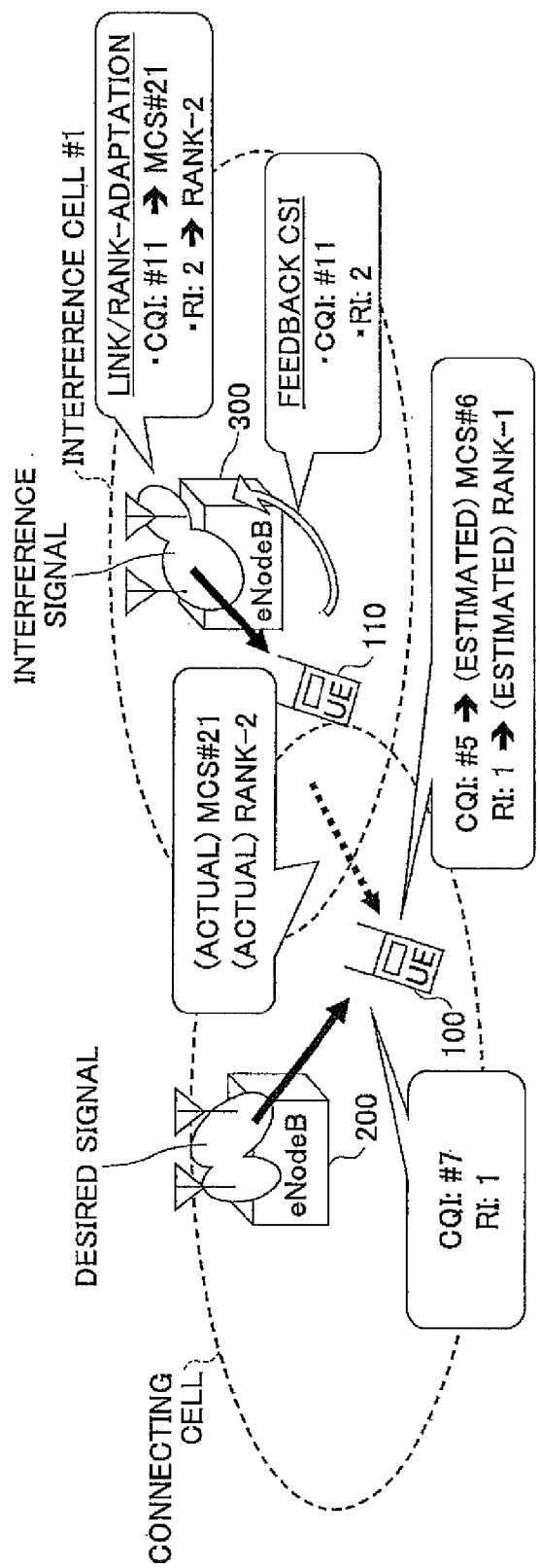
FIG. 5 is a diagram for explaining process outline of the first embodiment.

As an example of determination, in the example of FIG. 5, since the actual MCS and Rank of the interference signal are higher than the MCS and Rank estimated from the measured CSI respectively, accurate demodulation of the interference signal is difficult. Thus, the user apparatus 100 determines not to perform SIC for the interference signal.

As to the method by which the user apparatus 100 estimates MCS from measured CQI of the interference signal, although it is not limited to a particular method, CQI/MCS conversion table that is defined in 3GPP TS36.101 shown in FIG. 6 can be used. That is, the user apparatus 100 stores the conversion table in a storage device such as a memory. The user apparatus 100 searches the conversion table by the measured CQI to determine a corresponding MCS to be the estimated MCS. For estimating Rank of the measured interference signal from RI, the value of RI is determined to be Rank as it is, for example.

As a method for determining execution availability of SIC by comparison between the estimated MCS/Rank of the interference signal and the actual MCS/Rank, various determination is available as follows other than the determination method described in FIG. 5. By the way, since each of MCS and Rank corresponds to high/low of transmission efficiency of a signal, these may be collectively called transmission efficiency indicator.

<Determination Example 1-1: Determine Only by MCS>

In the determination example 1-1, the user apparatus 100 determines whether estimated MCS+α≥actual MCS holds true. When it holds true, the user apparatus 100 executes SIC of the interference signal, and when it does not hold true, the user apparatus does not perform SIC. In the above, α is a predetermined offset value, and it is an arbitrary value. In general, since reception quality of the interference signal is not good, it can be assumed that the estimated MCS is smaller than the actual MCS. Thus, the offset value is provided. When α is small, it can be considered that only interference signals that can be demodulated more accurately are used for SIC.

Also, for example, by setting α to be a large minus number (example; −99) such that the above-mentioned formula does not hold true, it is possible to perform operation in which SIC will never be performed for interference signals. On the other hand, by setting α to be a large positive number, it is possible to perform operation in which SIC is absolutely performed for interference signals. The same applies to β. Also, the same applies to α and β in the second embodiment.

<Determination Example 1-2: Determine Only by Rank>

In the determination example 1-2, the user apparatus 100 determines whether estimated Rank+β≥actual Rank holds true. When it holds true, the user apparatus 100 executes SIC of the interference signal, and when it does not hold true, the user apparatus does not perform SIC. In the above, β is a predetermined offset value, and it is an arbitrary value. In general, since reception quality of the interference signal is not good, it can be assumed that the estimated Rank is smaller than the actual Rank. Thus, the offset value is provided. When β is small, it can be considered that only interference signals that can be demodulated more accurately are used for SIC.

<Determination Example 1-3: Determine by MCS and Rank>

In the determination example 1-3, the user apparatus 100 determines whether (estimated MCS+α≥actual MCS) ^ (estimated Rank+β≥actual Rank) holds true. When it holds true, the user apparatus 100 executes SIC of the interference signal, and when it does not hold true, the user apparatus does not perform SIC. α and β are offsets described in the determination examples 1 and 2.

<Determination Example 1-4: Determine by Modulation Scheme>

In the determination example 1-4, the user apparatus 100 obtains a modulation scheme corresponding to the estimated MCS, and determines whether "modulation scheme corresponding to the estimated MCS≥actual modulation scheme of the interference signal" holds true. When it holds true, the user apparatus 100 executes SIC of the interference signal, and when it does not hold true, the user apparatus does not perform SIC. "modulation scheme corresponding to the estimated MCS≥actual modulation scheme of the interference signal" means that a modulation multi-level number of the modulation scheme corresponding to the estimated MCS is equal to or greater than the actual modulation multi-level number of the modulation scheme of the interference signal. For example, when the modulation scheme corresponding to the estimated MCS is QPSK, and the actual modulation scheme is also QPSK, SIC is performed. When the modulation scheme corresponding to the estimated MCS is QPSK, and the actual modulation scheme is 64 QAM, SIC is not performed. In the above-mentioned example, although an offset value is not added to the modulation scheme corresponding to the estimated MCS, an offset value may be added in the same way as the other determination examples.

For obtaining a modulation scheme from MCS, a MCS/modulation scheme correspondence table that is defined in 3GPP TS36.213. The correspondence table is shown in FIG. 7. That is, the user apparatus 100 stores the correspondence table in a storage device such as a memory. The user apparatus 100 searches the correspondence table by the estimated MCS to determine a corresponding value to be the modulation scheme.

As to the actual modulation scheme, the modulation scheme may be obtained by using the correspondence table of FIG. 7 from actual MCS, or the user apparatus 100 may estimate the actual modulation scheme of the interference signal. As to estimation of the modulation scheme, a technique described in the non-patent document 2 may be used, for example.

Each of the offset values α and β in the determination examples 1-1-1-3 may be individually set in the user apparatus 100 beforehand, or may be reported from the connecting base station 200 by RRC signaling and the like. Also, each of the above-mentioned determination methods can be also similarly applied to the case of ML reception.

<On Ordering>

As describe before, in the SIC receiver, the order (ordering, hereinafter) for performing subtraction of interference replicas exerts large effects on characteristics. Thus, ordering is performed in a descending order (descending order from high degree) of the degree of accuracy of demodulation or decoding that the SIC receiver can perform.

Although ordering can be performed in a descending order of received signal power (RSRP) or output SINR of the interference signal or the like, ordering may be performed by using measured MCS/Rank of interference signals in the present embodiment.

That is, the higher the estimated MCS that is obtained from measured CSI of the interference signal is, the higher the reception quality of the interference signal is Thus, the ordering can be performed in a descending order of the estimated MCS. Also, ordering may be performed in a descending order of estimated Rank.

Also, after grouping is performed by estimated Rank, ordering may be performed by estimated MCS. In this example, groups are ordered in an descending order of rank number (the number of streams), that is, in an order of group of rank 3, group of rank 2, group of rank 1, for example, and ordering is performed for each group based on estimated MCS. For example, in a case where grouping is performed for rank 2 and rank 1, and when a descending order of estimated MCS is obtained as interference signal 1, interference signal 2, and interference signal 3 in the group of rank 2, and, a descending order of estimated MCS is obtained as interference signal 4, interference signal 5, and interference signal 6 in the group of rank 1, then, the user apparatus 100 performs replica subtraction in order of interference signal 1, 2, 3, 4, 5 and 6.

The ordering of the present embodiment is performed after determining SIC execution availability by comparing the estimated MCS/Rank with the actual MCS/Rank. That is, as a result of SIC execution availability determination, ordering is performed for interference signals for which SIC is to be performed. The ordering described here may be similarly performed also in the second embodiment.

<On CoMP>

As described before, in the present embodiment (first and second embodiments), although the method for measuring CSI of the interference signal is not limited to a particular method, a mechanism of CSI measurement for the interference signal supported in CoMP may be used as an example. Since the mechanism itself is a conventional technique, only outline of this mechanism is described in the following.

In Rel.11 DL CoMP, in order to perform estimation of channel or interference in high accuracy, PDSCH (Physical Downlink Shared Channel) muting (Zero-power CSI-RS) is supported as a new reference signal, and zero-power CSI-RS configuration is used as a method for reporting the location of PDSCH muting. By using a radio resource where PDSCH muting is performed, the user apparatus performs interference estimation used for CSI feedback, so that flexible interference estimation assuming various CoMP transmission can be realized.

Also, in CoMP of Rel-11, one user apparatus can perform a plurality of kinds of CSI feedbacks. That is, the base station (eNodeB) can set, to the user apparatus (UE), various kinds of signal power measurement resources (CSI-RS resource), interference signal power measurement resources (CSI-interference measurement (CSI-IM) resource) and CSI process (combination of CSI-RS resource and CSI-IM resource) used for CST calculation.

Figure 9:
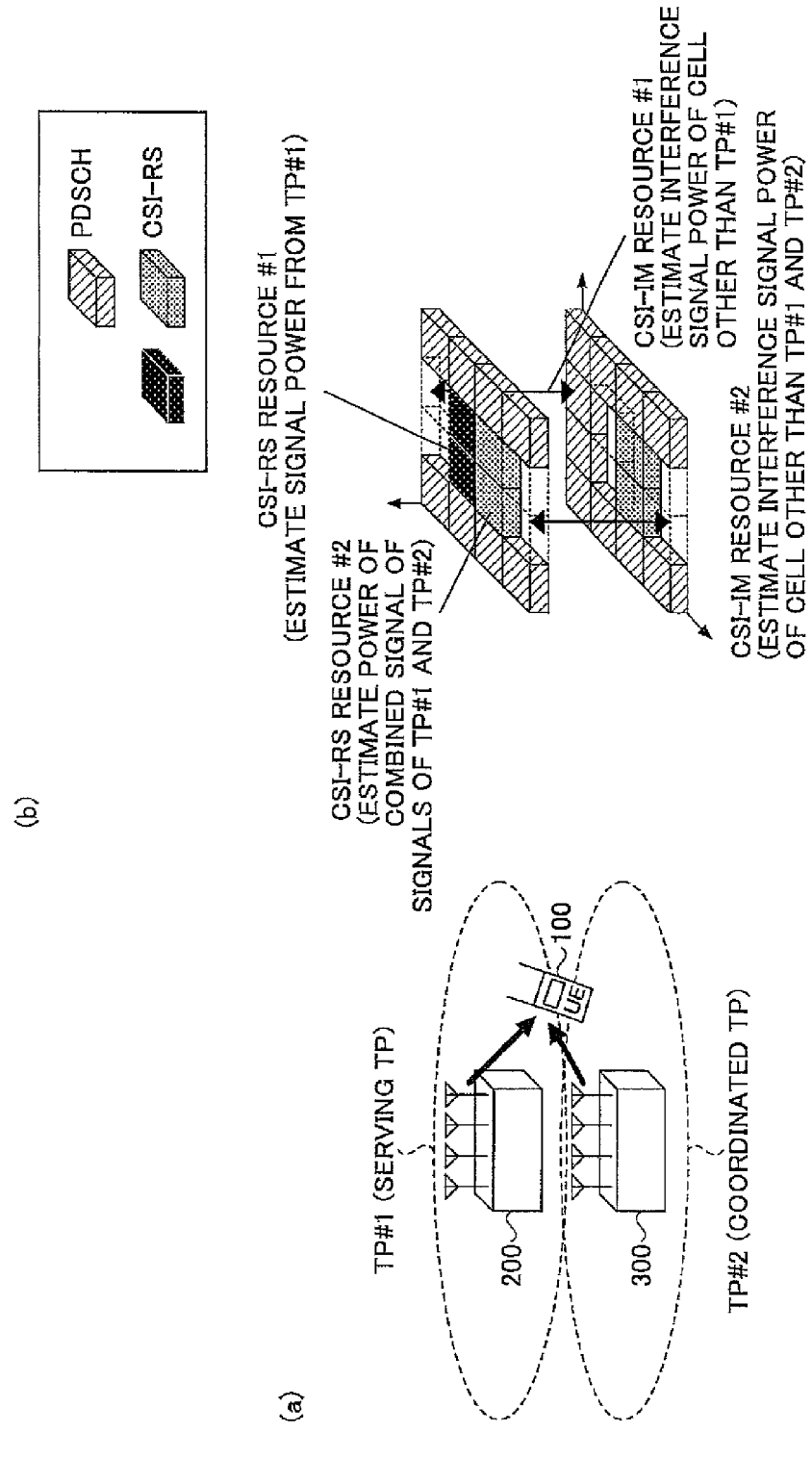
FIG. 9 is a diagram for explaining CSI feedback in CoMP.

In the example shown in FIG. 8, FIG. 9(*a*), (*b*), the user apparatus can perform a plurality of types of CSI feedbacks by using combinations of CSI-RS resources and CSI-IM resources of two types respectively.

For example, in FIG. 9(*a*), in a case where TP#1 is the connecting base station 200, and TP#2 is only one interference base station 300, the user apparatus can estimate interference signal power from the interference base station 300 by using CSI-IMresource#1 as shown in FIG. 9(*b*).

<Apparatus Configuration, Process Sequence Example>

Figure 10:
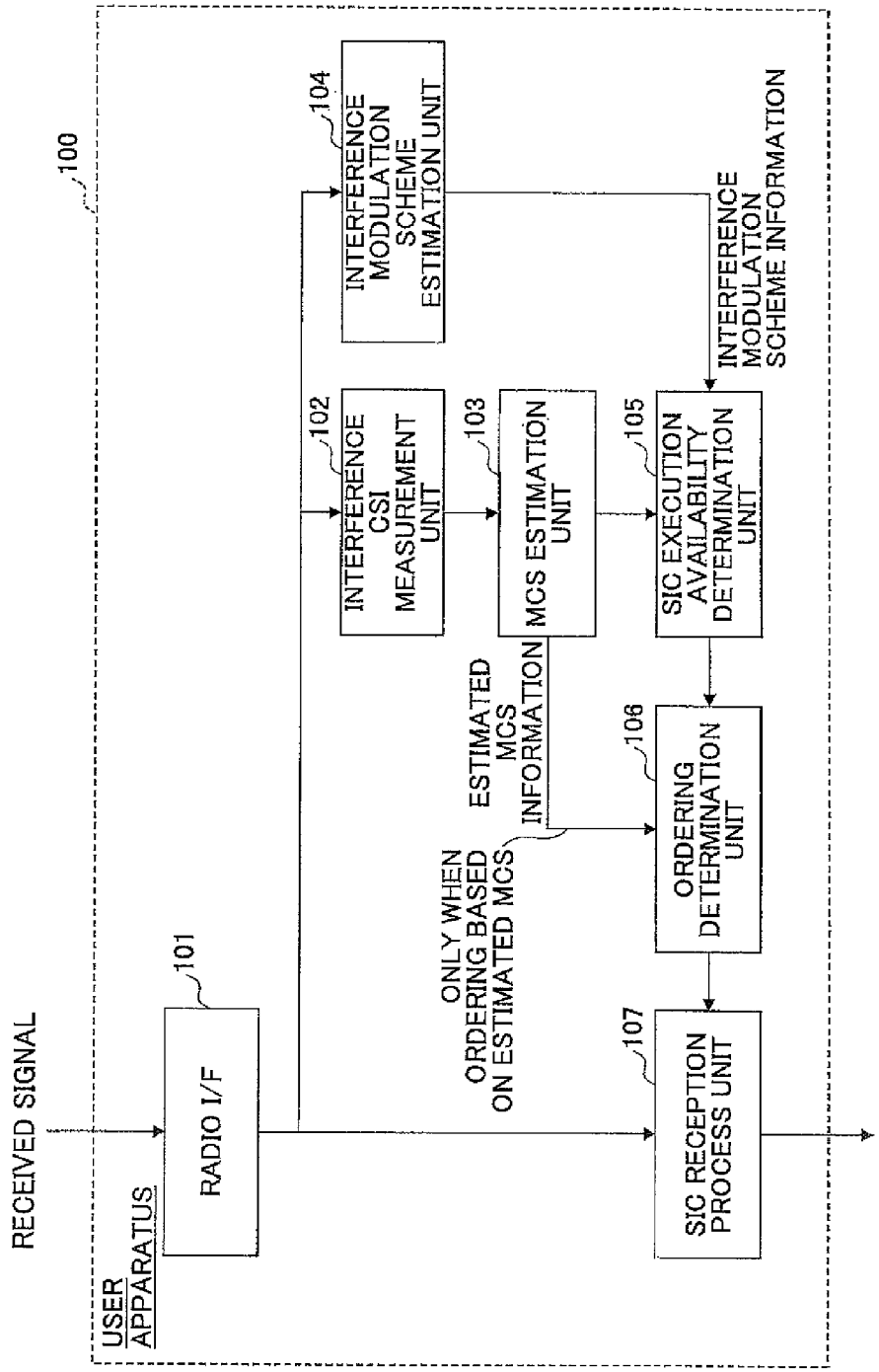
FIG. 10 is a diagram showing a configuration example of a user apparatus 100 in a case where SIC execution availability determination is performed by modulation scheme, and ordering is performed by estimated MCS in the first embodiment.

Next, an apparatus configuration example and a process sequence example in the first embodiment are described. FIG. 10 is a diagram showing a configuration example of the user apparatus 100 in a case where SIC execution availability determination is performed based on modulation schemes (determination example 1-4), and ordering is performed based on estimated MCS.

As shown in FIG. 10, the user apparatus 100 of this example includes a radio I/F 101, an interference CSI measurement unit 102, an MCS estimation unit 103, an interference modulation scheme estimation unit 104, a SIC execution availability determination unit 105, an ordering determination unit 106, and a SIC reception process unit 107.

The radio I/F 101 is a radio interface configured to transmit and receive a signal by radio. The interference CSI measurement unit 102 measures CSI of one or a plurality of interference signals from a received signal. The MCS estimation unit 103 estimates MCS suitable for demodulation based on measured CSI of each interference signal. The MCS estimation unit 103 estimates MCS by referring to the CQI/MCI conversion table shown in FIG. 6, for example.

The interference modulation scheme estimation unit 104 estimates a modulation scheme of a received signal by using a technique described in the non-patent document 2, for example. The SIC execution availability determination unit 105 determines whether to perform SIC for each interference signal from a modulation scheme corresponding to the estimated MCS and an estimated actual modulation scheme as described in the determination example 1-4. The ordering determination unit 106 determines ordering of SIC based on the estimated MCS, for example. The SIC reception process unit 107 performs SIC reception processing based on the ordering result.

Next, a process sequence example is described with reference to a sequence diagram of FIG. 11 in a case where SIC execution availability determination is performed based on modulation scheme, and ordering is performed based on estimated MCS.

Figure 11:
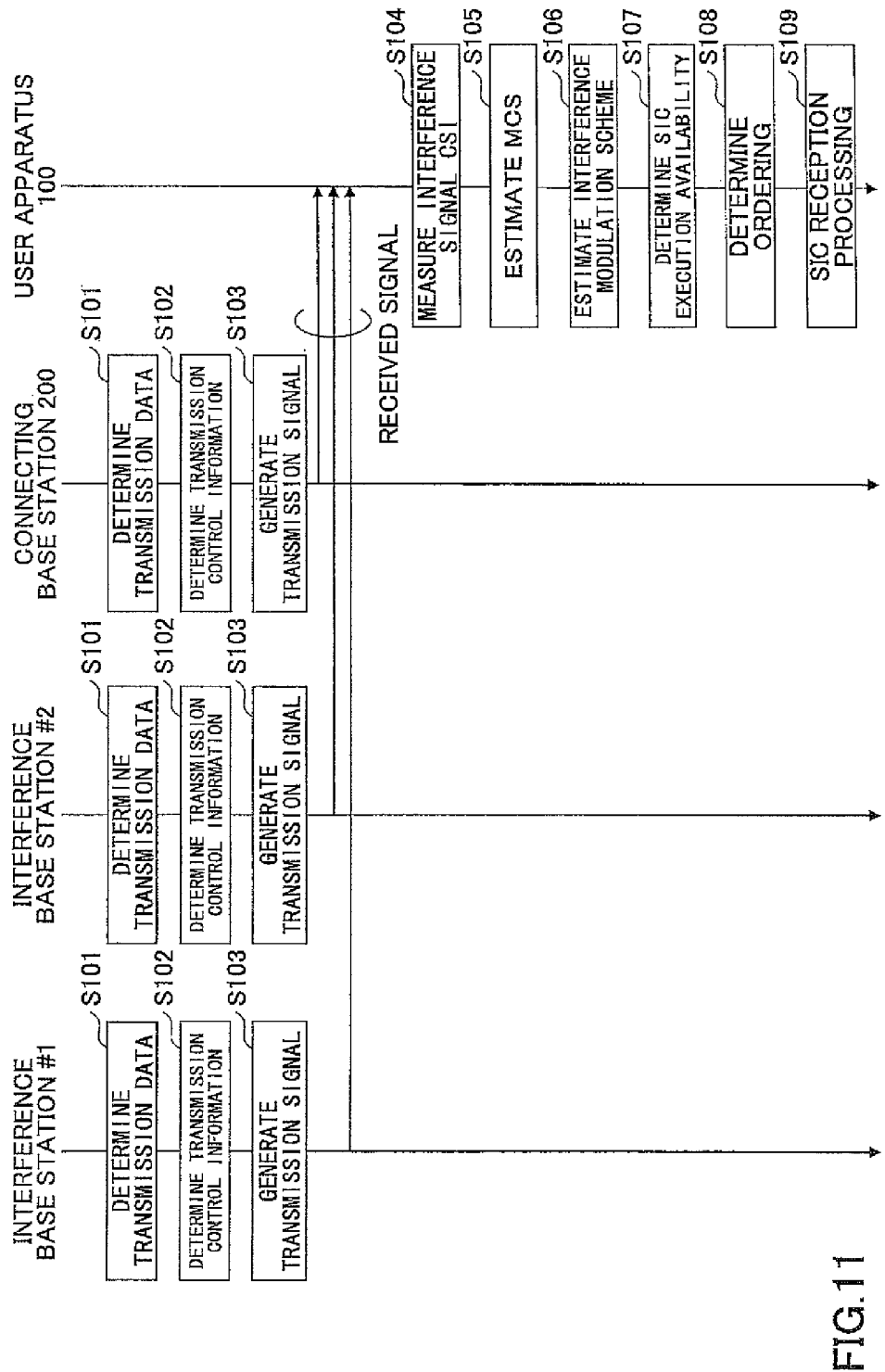
FIG. 11 is a diagram showing a process sequence example in a case where SIC execution availability determination is performed by modulation scheme, and ordering is performed by estimated MCS in the first embodiment.

As shown in FIG. 11, each base station determines transmission data (step 101), determines transmission control information (example: assigned resource, MCS, Rank and the like) (step 102), and generates a transmission signal and transmits it (step 103).

In the user apparatus 100, the interference CSI measurement unit 102 measures CSI of an interference signal (signal received from the interference base station) (step 104), and the MCS estimation unit 103 estimates MCS from CQI in the CSI (step 105). Also, the interference modulation scheme estimation unit 104 estimates a modulation scheme of an interference signal (step 106).

Then, the SIC execution availability determination unit 105 determines SIC execution availability of each interference signal by comparing the modulation scheme based on MCS obtained in step 105 with the actual modulation scheme estimated in step 106 (step 107). The ordering determination unit 106 determines an order for performing replica generation/subtraction on interference signals for which SIC execution becomes available in step 107 (step 108). Here, for example, it is determined that replica generation/subtraction is performed in a descending order of MCS estimated from the measured CSI. Then, the SIC reception process unit 107 performs SIC reception processing according to ordering determined in step 108 (step 109).

Figure 12:
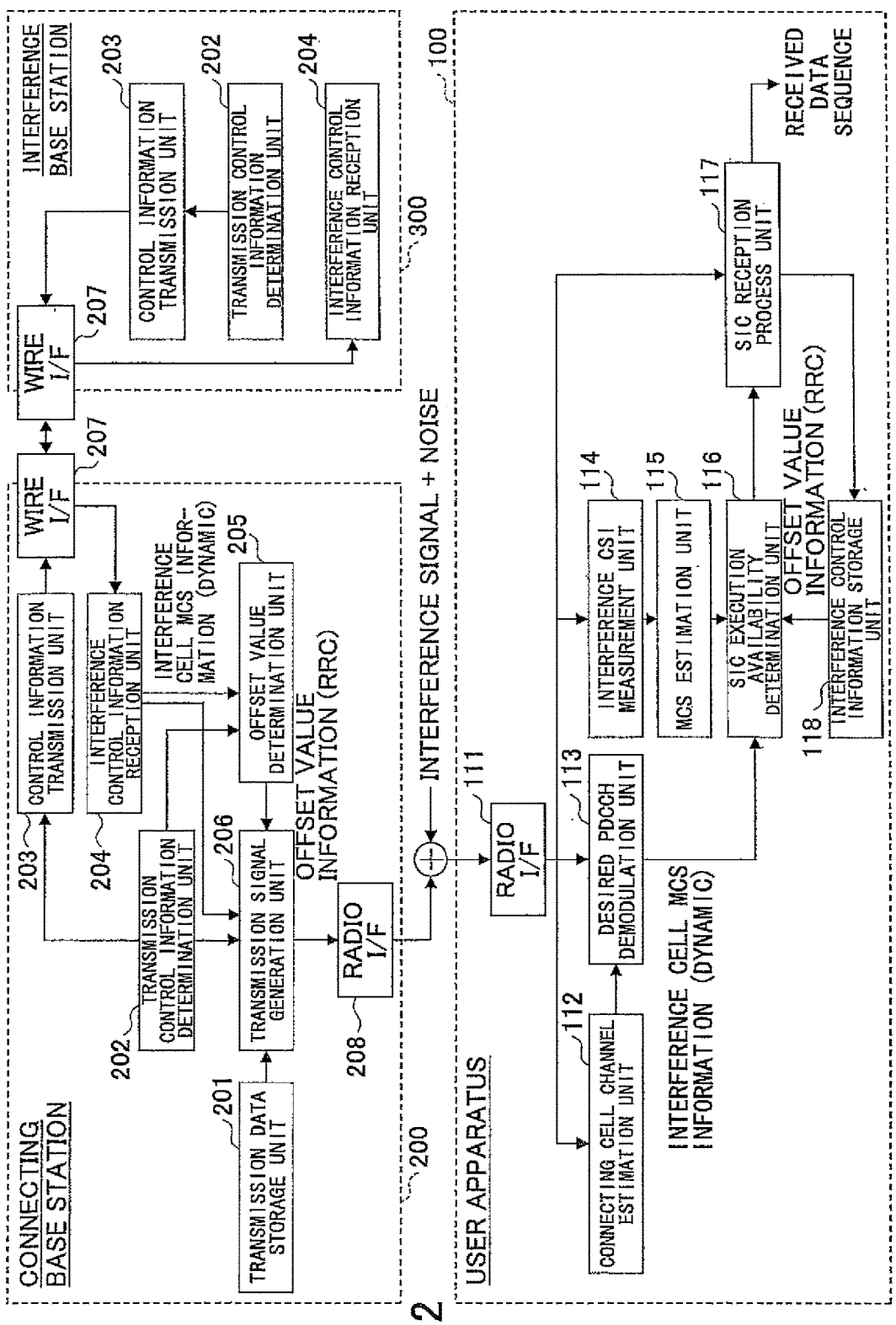
FIG. 12 is a diagram showing a system configuration example in a case where SIC execution availability determination is performed by MCS, and an offset value is reported in the first embodiment.

FIG. 12 shows a system configuration example in a case where SIC execution availability determination is performed by MCS (determination example 1-1), and an offset value is reported.

The connecting base station 200 of the present example includes a transmission data storage unit 201, a transmission control information determination unit 202, a control information transmission unit 203, an interference control information reception unit 204, an offset value determination unit 205, a transmission signal generation unit 206, a wire I/F 207, and a radio I/F 208. Although the interference base station 300 includes the same configuration, a part of components is shown for the interference base station 300.

The transmission data storage unit 201 is a memory configured to store data to be transmitted. The transmission control information determination unit 202 determines control information (MCS, scheduling and the like) of a transmission signal of the connecting base station 200. The control information transmission unit 203 transmits control information of the connecting base station 200 to other base station. The interference control information reception unit 204 receives control information from the interference base station 300.

The offset value determination unit 205 calculates an offset value on SIC execution availability the same applies to ML execution availability) in the user apparatus 100. The offset value may be, for example, dynamically calculated based on interference cell MCS information and connecting cell MCS information, or a predetermined value may be stored in a storage unit, so that the predetermined value may be used.

The transmission signal generation unit 206 generates a signal for transmission (including offset value information, interference cell MCS information and the like). The wire I/F 207 is a wire interface configured to transmit and receive a signal by wire. This may be a radio I/F instead of wire I/F. The radio I/F 208 is a radio interface configured to transmit and receive a signal by radio.

The user apparatus 100 of this example includes a radio I/F 111, a connecting cell channel estimation unit 112, a desired PDCCH demodulation unit 113, an interference CSI measurement unit 114, an MCS estimation unit 115, a SIC execution availability determination unit 116, a SIC reception process unit 117 and an interference control information storage unit 118.

The radio I/F 111 is a radio interface configured to transmit and receive a signal by radio. The connecting cell channel estimation unit 112 performs channel estimation for a connecting cell. The desired PDCCH demodulation unit 113 decodes desired PDCCH from the connecting cell. The interference CSI measurement unit 114 measures CSI of one or a plurality of interference signals from a received signal.

The MCS estimation unit 115 estimates MCS suitable for demodulation based on measured CSI of each interference signal. The SIC execution availability determination unit 116 determines whether to perform SIC for each interference signal based on the estimated MCS, offset information, and reported MCS of the interference cell. The SIC reception process unit 117 performs SIC reception processing (including ordering). The interference control information storage unit 118 is a memory configured to store an offset value reported from the connecting base station 200.

Next, a process sequence example is described with reference to a sequence diagram of FIG. 13 in a case where SIC execution availability determination is performed based on MCS, and an offset value is reported.

Figure 13:
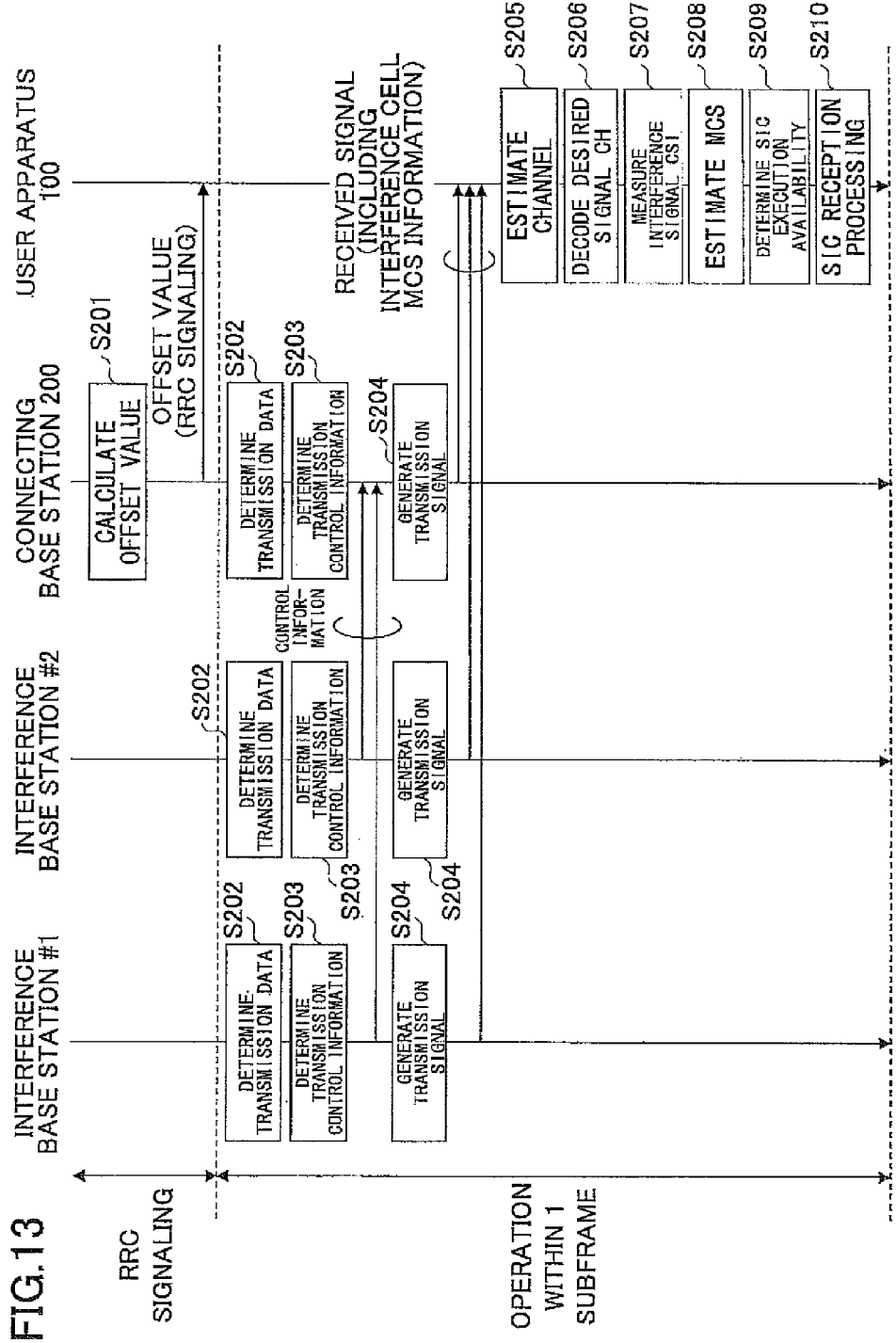
FIG. 13 is a diagram showing a process sequence example in a case where SIC execution availability determination is performed by MCS, and an offset value is reported in the first embodiment.

As shown in FIG. 13, first, the offset value determination unit 205 of the connecting base station 200 calculates an offset value, and reports it to the user apparatus 100 by RRC signaling (step 201).

Each base station determines transmission data (step 202), determines transmission control information (example: assigned resource, MCS, Rank and the like) (step 203), and generates a transmission signal and transmits it (step 204).

In the user apparatus 100, the connecting cell channel estimation unit 112 performs channel estimation (step 205), the desired PDCCH demodulation unit 113 decodes the desired control signal (PDCCH) (step 206). The interference CSI measurement unit 114 measures CSI of an interference signal (signal received from the interference base station)

(step 207), and the MCS estimation unit 115 estimates MCS from CQI in the CSI (step 208).

Then, the SIC execution availability determination unit 116 determines SIC execution availability of each interference signal based on the offset value obtained in step 201, the actual MCS of the interference signal obtained in step 206, and MCS based on CSI estimated in step 208 (step 209). The SIC reception process unit 117 performs SIC reception processing by performing replica generation/subtraction on interference signals for which SIC execution is determined to be available in step 209.

Although, in the example described with reference to FIG. 12 and FIG. 13, SIC execution availability is determined based on estimated MCS, similar configuration and sequence can be also applied for determining SIC execution availability by using estimated RI. That is, the process for estimating MCS is replaced with the process for estimating RI, and SIC execution availability decision is performed by the determination example 1-2. Also, as to the determination example 1-3, it can be realized by similar configuration and sequence.

In addition, the case of ML reception can be also realized by the similar configuration and sequence by replacing SIC execution availability with ML execution availability, and by replacing SIC reception processing with ML reception processing.

(Second Embodiment)

Next, a second embodiment is described.

<Content of the Process>

In the second embodiment, the user apparatus 100 measures CSI (CQI, RI) for a plurality of interference signals by respective reference signals. Information of CSI obtained by measurement is called measured reception quality information.

The user apparatus 100 converts actual MCS/Rank in a data signal part (PDSCH) of the interference signal into reception quality information (CSI (CQI, RI), SNR and the like, and compares the measured reception quality information with the reception quality information obtained by conversion so as to determine SIC execution availability for each interference signal.

An example is described with reference to FIG. 14. In the example shown in FIG. 14, the user apparatus 100 measures CSI of a desired signal as CQI:#7, RI:1 based on a reference signal received from the connecting base station 200.

Also, the user apparatus 100 measures CSI of an interference signal as CQI:#5, RI:1 based on a reference signal received from the interference base station 300. As normal Link/Rank-Adaptation operation in the interference base station 300, the interference base station 300 determines MCS#21 and Rank-2, and performs communication of downlink data to the user apparatus 110 under the interference base station 300. The data is an interference signal for the user apparatus 100.

The user apparatus 100 ascertains that actual MCS and Rank of the interference signal are MCS#21 and Rank-2 respectively by a notification from the connecting base station 200, for example, and converts MCS#21 and Rank-2 to CQI:#11 and RI:2 which are reception quality information.

Then, the user apparatus 100 compares the measured reception quality information (CQI:#5, RI:1) of the interference signal with the reception quality information (CQI:#11, RI:2) obtained by conversion to determine availability of execution of SIC for the interference signal.

Figure 14:
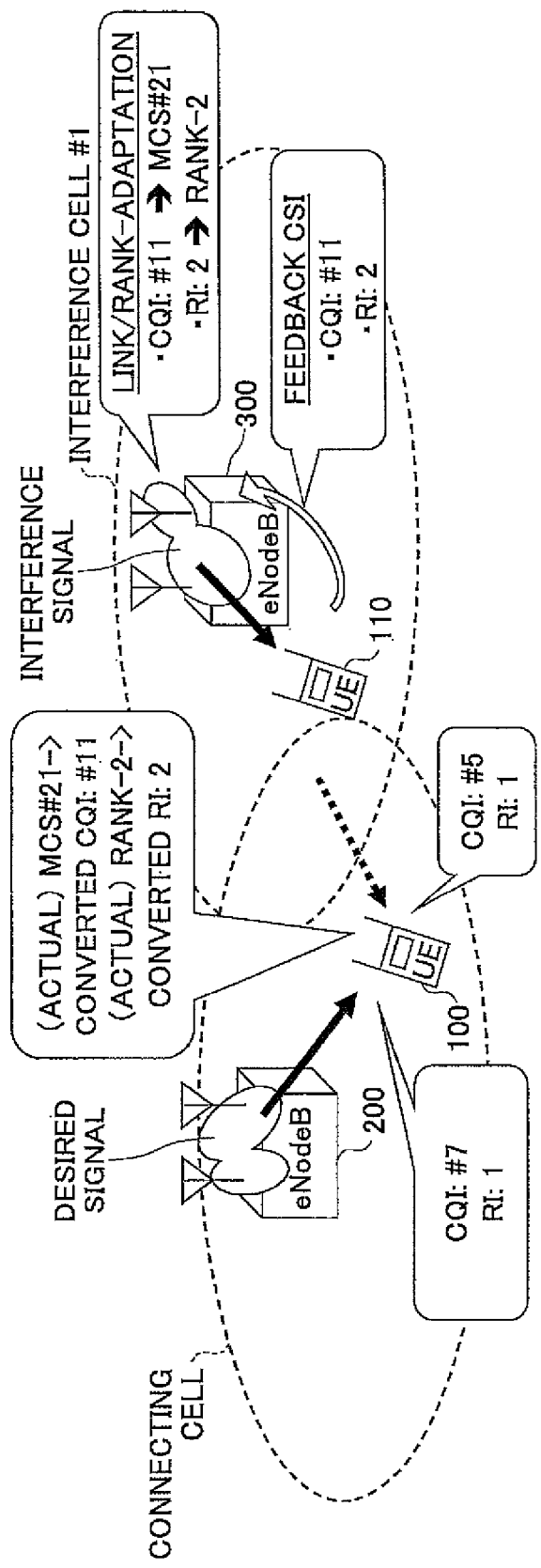
FIG. 14 is a diagram for explaining process outline of the second embodiment.

As an example of determination, in the example of FIG. 14, since the CQI/RI of the interference signal obtained by conversion are higher than the measured reception quality information (CQI:#5, RI:1) respectively, accurate demodulation of the interference signal is difficult. Thus, the user apparatus 100 determines not to perform SIC for the interference signal. As for the case of ML reception, similar determination is performed.

As to the method by which the user apparatus 100 converts the actual MCS/Rank into reception quality information is not limited to a particular method, there are following two methods as examples.

(Example 1) In the example 1, as a method for converting the actual MCS to CQI, CQI/MCS conversion table that is defined in 3GPP TS36.101 shown in FIG. 15 is used. That is, the user apparatus 100 stores the conversion table in a storage device such as a memory. The user apparatus 100 searches the conversion table by the actual MCS, and determines that a corresponding CQI to be a converted CQI. For MCS that is not in the conversion table, CQI is obtained using linear interpolation, for example. For example, in a case of MCS#7 (a value between 6 and 8), CQI can be calculated as CQI=#5.5 (a value between 5 and 6). For converting actual Rank into RI, actual Rank is used as RI, for example.

Figure 16:
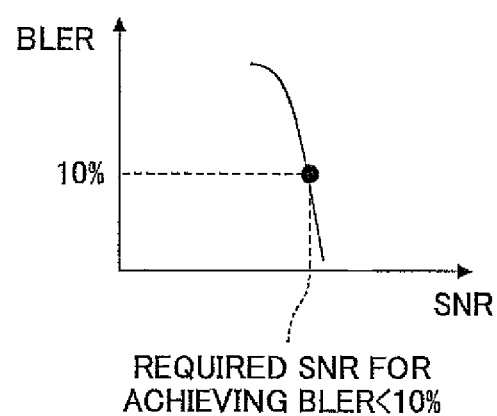
FIG. 16 is a diagram showing an example of an SNR-BLER curve in an AWGN environment for actual MCS.

(Example 2) In the example 2, the user apparatus 100 refers to an SNR-BLER (or BER) table (stored in the user apparatus for each MCS) in an AWGN environment for actual MCS, and, as shown in FIG. 16, converts MCS into required SNR that makes BLER to be equal to or less than 10%, for example. In the example 2, the user apparatus 100 measures output SINR (reception quality information) of an interference signal. The user apparatus 100 compares the output SINR with the SNR converted as mentioned above so as to determine execution availability of SIC. For example, it is determined that SIC is performed if "output SINR+ offset value≥the above SNR" holds true.

As a method for determining execution availability of SIC by comparison between the measured reception quality information of the interference signal and the reception quality information obtained by conversion, various determination is available as follows other than the determination method described in FIG. 14.

<Determination Example 2-1: Determine Only by Reception Quality Information Converted from MCS>

In the determination example 2-1, the user apparatus 100 determines whether "measured reception quality+α≥MCS converted reception quality information" holds true. When it holds true, the user apparatus 100 executes SIC of the interference signal, and when it does not hold true, the user apparatus does not perform SIC. In the above, α is a predetermined offset value, and it is an arbitrary value. In general, since reception quality of the interference signal is not good, it can be assumed that the measured reception quality is smaller than the reception quality converted from the actual MCS. Thus, the offset value is provided. When α is small, it can be considered that only interference signals that can be demodulated more accurately are used for SIC. In the determination example 2-1, SIC is performed if measured reception quality is CQI:#8, α=1, and MCS converted reception quality information is CQI:#9.

<Determination Example 2-2: Determine Only by Reception Quality Information Converted from Rank>

In the determination example 2-2, the user apparatus 100 determines whether "measured reception quality+β≥Rank converted reception quality information" holds true. When it holds true, the user apparatus 100 executes SIC of the interference signal, and when it does not hold true, the user apparatus does not perform SIC. In the above, β is a predetermined offset value, and it is an arbitrary value. In general, since reception quality of the interference signal is not good, it can be assumed that the measured reception quality (RI) is smaller than the reception quality (RI) converted from the actual Rank. Thus, the offset value is provided. When β is small, it can be considered that only interference signals that can be demodulated more accurately are used for SIC. In the determination example 2-2, SIC is performed if measured reception quality is RI:1, β=1, and Rank converted reception quality information is RI:2.

<Determination Example 2-3: Determine by Reception Quality Information Converted from MCS and Rank>

In the determination example 2-3, the determination example 2-1 and the determination example 2-2 are connected by AND. That is, the user apparatus determines whether (measured reception quality+α≥MCS converted reception quality information) ^(measured reception quality+β≥Rank converted reception quality information) holds true. When it holds true, the user apparatus 100 executes SIC of the interference signal, and when it does not hold true, the user apparatus does not perform SIC. α and β are offset values described in the determination examples 2-1 and 2-2.

Each of the offset values α and β in the determination examples 2-1-2-3 may be individually set in the user apparatus 100 beforehand, or may be reported from the connecting base station 200 by RRC signaling and the like.

Each of the above-mentioned determination methods can be similarly applied to the case of ML reception.

<Apparatus Configuration Example, Process Flow Example>

Figure 17:
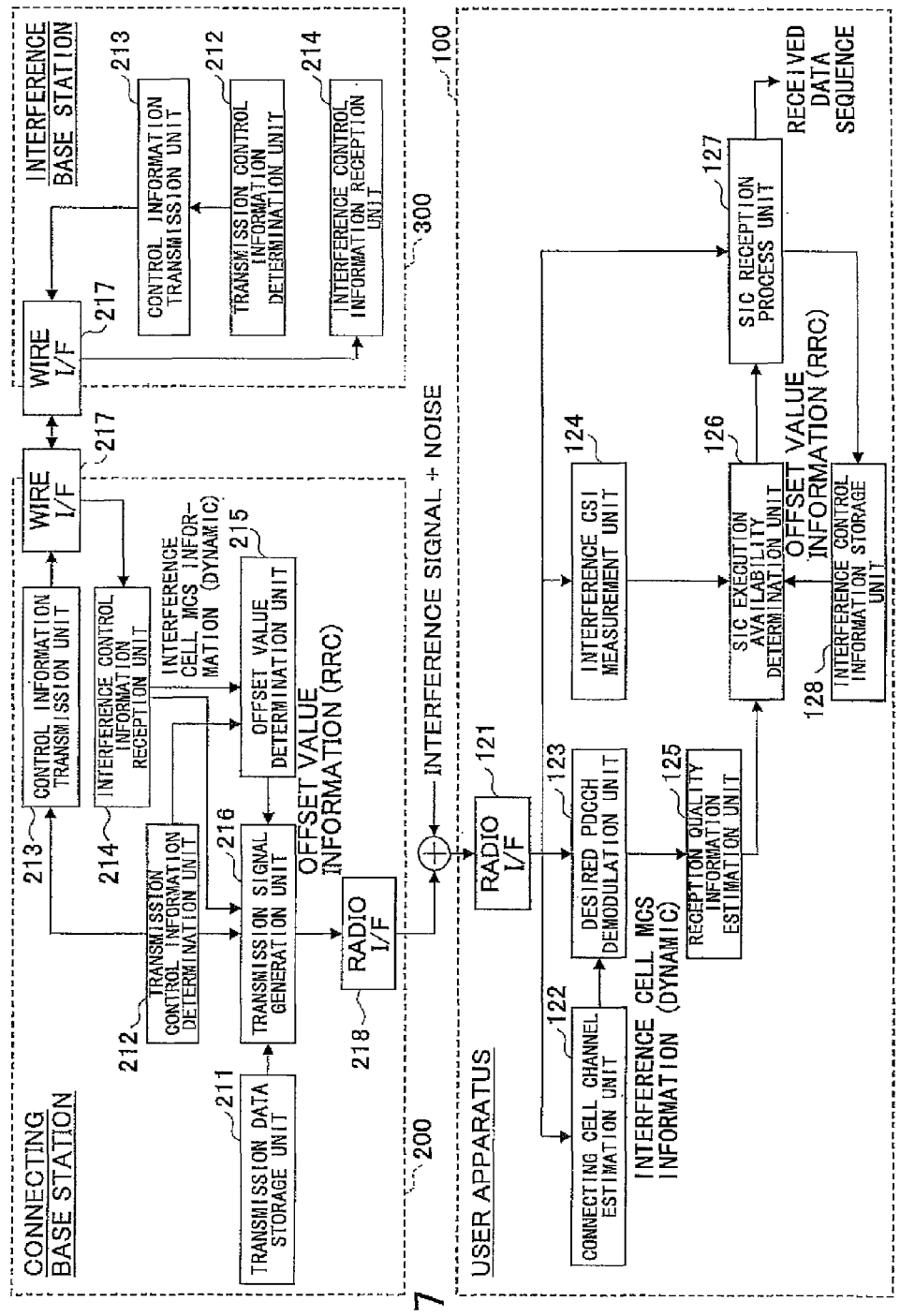
FIG. 17 is a diagram showing a system configuration example in a case where SIC execution availability determination is performed by reception quality information, and an offset value is reported in the second embodiment.

Next, an apparatus configuration example and a process sequence example in the second embodiment are described. FIG. 17 shows a system configuration example in a case where SIC execution availability determination is performed by reception quality information (Example: CQI), and an offset value is reported.

The connecting base station 200 of the present example includes a transmission data storage unit 211, a transmission control information determination unit 212, control information transmission unit 213, an interference control information reception unit 214, an offset value determination unit 215, a transmission signal generation unit 216, a wire I/F 217, and a radio I/F 218. Although the interference base station 300 includes the same configuration, a part of components is shown for the interference base station 300.

The transmission data storage unit 211 is a memory configured to store data to be transmitted. The transmission control information determination unit 212 determines control information (MCS, scheduling and the like) of a transmission signal of the connecting base station 200. The control information transmission unit 213 transmits control information of the connecting base station 200 to other base station. The interference control information reception unit 214 receives control information from the interference base station 300.

The offset value determination unit 215 calculates an offset value on SIC execution availability in the user apparatus 100. The offset value may be, for example, dynamically calculated based on interference cell MCS information and connecting cell MCS information, or a predetermined value may be stored in a storage unit, so that the predetermined value may be used.

The transmission signal generation unit 216 generates a signal for transmission (including offset value information, interference cell MCS information and the like). The wire I/F 217 is a wire interface configured to transmit and receive a signal by wire. This may be a radio I/F instead of wire I/F.

The radio I/F 218 is a radio interface configured to transmit and receive a signal by radio.

The user apparatus 100 of this example includes a radio I/F 121, a connecting cell channel estimation unit 122, a desired PDCCH demodulation unit 123, an interference CSI measurement unit 124, a reception quality information estimation unit 125, a SIC execution availability determination unit 126, a SIC reception process unit 127 and an interference control information storage unit 128.

The radio I/F 121 is a radio interface configured to transmit and receive a signal by radio. The connecting cell channel estimation unit 122 performs channel estimation for a connecting cell. The desired PDCCH demodulation unit 123 decodes desired PDCCH from the connecting cell. The interference CSI measurement unit 124 measures CSI of one or a plurality of interference signals from a received signal.

The reception quality information estimation unit 125 estimates reception quality information (CSI (example: CQI), SNR and the like) based on reported MCS. The SIC execution availability determination unit 126 determines whether to perform SIC for each interference signal from the estimated reception quality information and offset information, and measured reception quality information (CSI and the like) of the interference cell. The SIC reception process unit 127 performs SIC reception processing (including ordering). The interference control information storage unit 128 is a memory configured to store an offset value reported from the connecting base station 200.

Next, a process sequence example is described with reference to a sequence diagram of FIG. 18 in a case where SIC execution availability determination is performed based on reception quality information, and an offset value is reported.

As shown in FIG. 18, first, the offset value determination unit 215 of the connecting base station 200 calculates an offset value, and reports it to the user apparatus 100 by RRC signaling (step 301).

Each base station determines transmission data (step 302), determines transmission control information (example: assigned resource, MCS, Rank and the like) (step 303), and generates a transmission signal and transmits it (step 304).

In the user apparatus 100, the connecting cell channel estimation unit 122 performs channel estimation (step 305), the desired PDCCH demodulation unit 123 decodes the desired control signal (PDCCH) (step 306). The reception quality information estimation unit 125 estimates reception quality information from actual MCS of the interference signal obtained in step 306 (step 307). The interference CSI measurement unit 124 measures CSI of an interference signal (signal received from the interference base station) (step 308).

Then, the SIC execution availability determination unit 126 determines SIC execution availability of each interference signal based on the reception quality information of the interference signal obtained in step 307, the offset value obtained in step 301, and the reception quality information based on CSI estimated in step 308 (step 309). The SIC reception process unit 127 performs SIC reception processing by performing replica generation/subtraction on interference signals for which SIC execution is determined to be available in step 309.

Although, in the example described with reference to FIG. 17 and FIG. 18, SIC execution availability is determined by reception quality information based on MCS, similar configuration and sequence can be also applied for determining SIC execution availability by reception quality information based on Rank. That is, the process for obtaining reception quality from MCS is replaced with the process for obtaining reception quality from RI, and SIC execution availability decision is performed by the determination example 2-2. Also, the determination example 2-3 can be realized by similar configuration and sequence.

In addition, the case of ML reception can be also realized by the similar configuration and sequence by replacing SIC execution availability with ML execution availability, and by replacing SIC reception processing with ML reception processing.

(Summary of Embodiments, Effects, and the Like)

As described in the first and the second embodiments, according to the present embodiments, in the user apparatus for performing interference reduction processing, it becomes possible to properly select an interference signal as a target for interference reduction processing so as to perform interference reduction processing on the selected interference signal, so that reception performance improvement effect can be obtained.

The configuration of each apparatus described in the first and the second embodiments is an example. The configuration of the user apparatus in an embodiment of the present invention is not limited to configurations described so far, and any configuration can be adopted as long as the apparatus configuration can realize operation described in the embodiments.

For example, according to an embodiment of the present invention, there is provided a user apparatus for use in a radio communication system, including:

an interference reduction process unit configured to reduce, from a received signal received by the user apparatus, an interference signal that becomes interference to a desired signal so as to obtain the desired signal;

an interference reduction process execution determination unit configured to measure reception quality of the interference signal, and to determine whether to regard the interference signal as a target of interference reduction processing based on the reception quality, wherein the interference reduction process execution determination unit determines whether to regard the interference signal as the target of interference reduction processing by comparing a first indicator value of the interference signal that is estimated from the reception quality with a second indicator value that is used for transmission of the interference signal.

The first indicator value is, for example, an MCS or a rank that is estimated from the reception quality, and the second indicator value is, for example, an MCS or a rank that is used by an interference base station for transmitting the interference signal. The MCS or the rank can be estimated easily from CSI (CQI, RI) that is reception quality by using a conversion table, for example. Thus, by using an MCS or a rank as the indicator value, the user apparatus can be relatively easily realized.

The interference reduction process execution determination unit regards the interference signal as a target of interference reduction processing, for example, when a value obtained by adding an offset value to the first indicator value is equal to or greater than the second indicator value. In general, since reception quality of interference signals is not good, it is assumed that the first indicator value (example: estimated MCS) becomes smaller than the second indicator value (example: actual MCS). Thus, by adopting the offset value, an interference signal of a target of interference reduction processing can be determined more properly.

The user apparatus receives the offset value from a base station connected to the user apparatus, for example. By adopting the scheme of receiving from the base station, it becomes possible that the user apparatus can use an offset value suitable for reception environment for each cell.

Also, the first indicator value may be a value indicating a modulation scheme estimated from the reception quality, and the second indicator value may be a value indicating a modulation scheme used by an interference base station for transmitting the interference signal. Since the user apparatus can estimate a modulation scheme from reception quality easily, and also user apparatus can estimate a modulation scheme used by the interference base station based on the interference signal. Thus, by adopting this scheme, for example, it becomes possible to determine a target of interference reduction processing without receiving actual MCS information and the like of the interference signal from the base station.

Also, according to an embodiment of the present invention, there is provided a user apparatus for use in a radio communication system, including:

an interference reduction process unit configured to reduce, from a received signal received by the user apparatus, an interference signal that becomes interference to a desired signal so as to obtain the desired signal;

an interference reduction process execution determination unit configured to measure reception quality of the interference signal as first reception quality, and to determine whether to regard the interference signal as a target of interference reduction processing based on the first reception quality, wherein the interference reduction process execution determination unit determines whether to regard the interference signal as the target of interference reduction processing by comparing the first reception quality with second reception quality that is estimated from an indicator value that is used for transmission of the interference signal.

The indicator value is, for example, an MCS or a rank that is used by an interference base station for transmitting the interference signal. The reception quality (CQI, RI and the like) can be estimated easily from MCS or rank by using a conversion table. Thus, by adopting an MCS or a rank as the indicator value, the user apparatus can be relatively easily realized.

The interference reduction process execution determination unit regards the interference signal as a target of interference reduction processing, for example, when a value obtained by adding an offset value to the first reception quality is equal to or greater than the second reception quality. In general, since reception quality of interference signals is not good, it is assumed that the first reception quality (example: measured CQI) becomes smaller than the second reception quality (example: actual CQI converted from actual MCS). Thus, by adopting the offset value, an interference signal of a target of interference reduction processing can be determined more properly.

In the above, the present invention has been explained while referring to the specific embodiments. However, the disclosed embodiment is not limited to the embodiments, and those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item (example) in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus (UE) and the base station (eNodeB) have been explained by using functional block diagrams. However, the apparatuses may be implemented in hardware, software, or a combination thereof. The software that operates according to the present invention (software executed by a processor provided in the user apparatus UE, software executed by a processor provided in the base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-200605, filed in the JPO on Sep. 26, 2013 and the entire contents of the Japanese patent application No. 2013-200605 are incorporated herein by reference.

DESCRIPTION OF REFERENCE SIGNS 100 user apparatus
101, 111, 121 radio I/F
102 interference CSI measurement unit
103 MCS estimation unit
104 interference modulation scheme estimation unit
105 SIC execution availability determination unit
106 ordering determination unit
107 SIC reception process unit
112, 122 connecting cell channel estimation unit
113, 123 desired PDCCH demodulation unit
114, 124 interference CSI measurement unit
115 MCS estimation unit
116, 126 SIC execution availability determination unit
117, 127 SIC reception process unit
118, 128 interference control information storage unit
125 reception quality information estimation unit
200 connecting base station
201, 211 transmission data storage unit
202, 212 transmission control information determination unit
203, 213 control information transmission unit
204, 214 interference control information reception unit
205, 215 offset value determination unit
206, 216 transmission signal generation unit
207, 217 wire I/F
208, 218 radio I/F
300 interference base station

The invention claimed is:

1. A user apparatus for use in a radio communication system, comprising:
an interference reduction process unit configured to reduce, from a received signal received by the user apparatus, an interference signal that becomes interference to a desired signal so as to obtain the desired signal;
an interference reduction process execution determination unit configured to measure reception quality of the interference signal, and to determine whether to regard the interference signal as a target of interference reduction processing based on the reception quality,
wherein the interference reduction process execution determination unit determines whether to regard the interference signal as the target of interference reduction processing by comparing a first indicator value of the interference signal that is estimated from the reception quality with a second indicator value that is used for transmission of the interference signal.

2. The user apparatus as claimed in claim 1, wherein the first indicator value is a Modulation and Coding Scheme (MCS) or a rank that is estimated from the reception quality, and the second indicator value is an MCS or a rank that is used by an interference base station for transmitting the interference signal.

3. The user apparatus as claimed in claim 1, wherein the interference reduction process execution determination unit regards the interference signal as a target of interference reduction processing when a value obtained by adding an offset value to the first indicator value is equal to or greater than the second indicator value.

4. The user apparatus as claimed in claim 3, wherein the user apparatus receives the offset value from a base station connected to the user apparatus.

5. The user apparatus as claimed in claim 1, wherein the first indicator value is a value indicating a modulation scheme estimated from the reception quality, and the second indicator value is a value indicating a modulation scheme used by an interference base station for transmitting the interference signal.

6. A user apparatus for use in a radio communication system, comprising:
an interference reduction process unit configured to reduce, from a received signal received by the user apparatus, an interference signal that becomes interference to a desired signal so as to obtain the desired signal;
an interference reduction process execution determination unit configured to measure reception quality of the interference signal as first reception quality, and to determine whether to regard the interference signal as a target of interference reduction processing based on the first reception quality,
wherein the interference reduction process execution determination unit determines whether to regard the interference signal as the target of interference reduction processing by comparing the first reception quality with second reception quality that is estimated from an indicator value that is used for transmission of the interference signal.

7. The user apparatus as claimed in claim 6, wherein the indicator value is a Modulation and Coding Scheme (MCS) or a rank that is used by an interference base station for transmitting the interference signal.

8. The user apparatus as claimed in claim 6, wherein the interference reduction process execution determination unit regards the interference signal as a target of interference reduction processing when a value obtained by adding an offset value to the first reception quality is equal to or greater than the second reception quality.

9. An interference reduction process method executed by a user apparatus for use in a radio communication system, comprising:
- an interference reduction process execution determination step of measuring reception quality of an interference signal that becomes interference to a desired signal of the user apparatus, and determining whether to regard the interference signal as a target of interference reduction processing based on the reception quality; and
- an interference reduction step of reducing, from a received signal received by the user apparatus, the interference signal that is determined to be a target of interference reduction processing by the interference reduction process execution determination step so as to obtain the desired signal;
- wherein, in the interference reduction process execution determination step, the user apparatus determines whether to regard the interference signal as the target of interference reduction processing by comparing a first indicator value of the interference signal that is estimated from the reception quality with a second indicator value that is used for transmission of the interference signal.

10. An interference reduction process method executed by a user apparatus for use in a radio communication system, comprising:
- an interference reduction process execution determination step of measuring reception quality of an interference signal that becomes interference to a desired signal of the user apparatus as first reception quality, and determining whether to regard the interference signal as a target of interference reduction processing based on the first reception quality; and
- an interference reduction step of reducing, from a received signal received by the user apparatus, the interference signal that is determined to be a target of interference reduction processing by the interference reduction process execution determination step so as to obtain the desired signal;
- wherein, in the interference reduction process execution determination step, the user apparatus determines whether to regard the interference signal as the target of interference reduction processing by comparing the first reception quality with second reception quality that is estimated from an indicator value that is used for transmission of the interference signal.

11. The user apparatus as claimed in claim 2, wherein the interference reduction process execution determination unit regards the interference signal as a target of interference reduction processing when a value obtained by adding an offset value to the first indicator value is equal to or greater than the second indicator value.

12. The user apparatus as claimed in claim 7, wherein the interference reduction process execution determination unit regards the interference signal as a target of interference reduction processing when a value obtained by adding an offset value to the first reception quality is equal to or greater than the second reception quality.

* * * * *